US012607805B2

(12) United States Patent
Ooki et al.

(10) Patent No.: US 12,607,805 B2
(45) Date of Patent: Apr. 21, 2026

(54) FUSION SPLICING SYSTEM FOR OPTICAL FIBERS, FUSION SPLICER, MODEL CREATION DEVICE, AND METHOD FOR FUSION SPLICING OPTICAL FIBERS

(71) Applicant: Sumitomo Electric Optifrontier Co., Ltd., Yokohama (JP)

(72) Inventors: Kazuyoshi Ooki, Yokohama (JP); Takahiro Suzuki, Yokohama (JP); Hideaki Yusa, Yokohama (JP)

(73) Assignee: Sumitomo Electric Optifrontier Co., Ltd., Yokohama (JP)

( * ) Notice: Subject to any disclaimer, the term of this patent is extended or adjusted under 35 U.S.C. 154(b) by 857 days.

(21) Appl. No.: 17/907,686

(22) PCT Filed: Apr. 12, 2021

(86) PCT No.: PCT/JP2021/015210
§ 371 (c)(1),
(2) Date: Sep. 29, 2022

(87) PCT Pub. No.: WO2021/210546
PCT Pub. Date: Oct. 21, 2021

(65) Prior Publication Data
US 2023/0126843 A1 Apr. 27, 2023

(30) Foreign Application Priority Data
Apr. 17, 2020 (WO) .................. PCT/JP2020/016860

(51) Int. Cl.
*G02B 6/255* (2006.01)
(52) U.S. Cl.
CPC ................................. *G02B 6/2553* (2013.01)
(58) Field of Classification Search
CPC ...... G01M 11/35; G01M 11/30; G02B 6/2553
See application file for complete search history.

(56) References Cited

U.S. PATENT DOCUMENTS 6,966,708 B2 * 11/2005 Hattori ................. G02B 6/2555
385/95
2015/0278639 A1 * 10/2015 Leighton .................. G02B 6/02
382/203

(Continued)

FOREIGN PATENT DOCUMENTS

CN 102567745 A 7/2012
JP 2015-172736 A 10/2015

(Continued)

OTHER PUBLICATIONS

International Search Report issued in Patent Application No. PCT/JP2021/015210 dated Jun. 29, 2021.

*Primary Examiner* — Sung H Pak
(74) *Attorney, Agent, or Firm* — McDonald Hopkins LLC

(57) ABSTRACT

This fusion splicing system includes a model creation device and a plurality of fusion splicers. The model creation device creates a determination model by performing machine learning using sample data indicating a correspondence relationship between feature amounts obtained from imaging data of optical fibers and types of the optical fibers. Each fusion splicer has an imaging unit, a determination unit, and a splicing unit. The imaging unit generates imaging data. The determination unit inputs feature amounts to the determination model and determines a type of each of the pair of optical fibers. The splicing unit fusion splices the pair of optical fibers on splicing conditions based on determination results. The model creation device creates the determination model by classifying the plurality of fusion splicers into two or more groups each estimated to have similar tendencies in the imaging data and collecting the sample data for each group.

18 Claims, 13 Drawing Sheets

(56)　　　　　　　References Cited

U.S. PATENT DOCUMENTS

| 2016/0246659 | A1 |   | 8/2016 | Komatsu et al. |
| 2019/0213479 | A1 |   | 7/2019 | Takigawa et al. |
| 2020/0056960 | A1 | * | 2/2020 | Kise ....................... G06V 20/20 |
| 2020/0064549 | A1 |   | 2/2020 | Nishina et al. |

FOREIGN PATENT DOCUMENTS

| JP | 2016-097228 | A | 5/2016 |
| JP | 2016-152011 | A | 8/2016 |
| JP | 6362521 | B2 | 7/2018 |
| JP | 2019-118940 | A | 7/2019 |
| JP | 2020-020997 | A | 2/2020 |
| JP | 2020-020998 | A | 2/2020 |

* cited by examiner

FUSION SPLICING SYSTEM FOR OPTICAL FIBERS, FUSION SPLICER, MODEL CREATION DEVICE, AND METHOD FOR FUSION SPLICING OPTICAL FIBERS

TECHNICAL FIELD

The present disclosure relates to a fusion splicing system for optical fibers, a fusion splicer, a model creation device, and a method for fusion splicing optical fibers. This application is based upon and claims the benefit of priority from International Application No. PCT/JP2020/016860, filed on Apr. 17, 2020, the entire contents of which are incorporated herein by reference.

BACKGROUND ART

Patent Literature 1 and Patent Literature 2 disclose a fusion splicing system, a fusion splicer, and an optical fiber type determination method.

CITATION LIST

Patent Literature

[Patent Literature 1] Japanese Unexamined Patent Publication No. 2020-20997
[Patent Literature 2] Japanese Unexamined Patent Publication No. 2020-20998

SUMMARY OF INVENTION

A fusion splicing system of the present disclosure includes a model creation device and a plurality of fusion splicers. The model creation device creates a determination model for determining types of optical fibers to be spliced based on imaging data of the optical fibers to be spliced by performing machine learning using sample data indicating a correspondence relationship between feature amounts obtained from imaging data of the optical fibers and types of the optical fibers. Each of the plurality of fusion splicers has an imaging unit, a determination unit, and a splicing unit. The imaging unit images a pair of optical fibers and generates imaging data. The determination unit determines the type of each of the pair of optical fibers by inputting the feature amounts obtained from the imaging data provided from the imaging unit into the determination model. The splicing unit fusion splices the pair of optical fibers to each other on splicing conditions corresponding to a combination of the types of the pair of optical fibers based on determination results from the determination unit. The model creation device creates the determination model by classifying the plurality of fusion splicers into two or more groups each estimated to have similar tendencies in the imaging data and collecting the sample data for each group. The determination unit of each of the fusion splicers determines the type of each of the pair of optical fibers using the determination model corresponding to the group to which each of the fusion splicers belongs.

The fusion splicer of the present disclosure has an imaging unit, a determination unit, and a splicing unit. The imaging unit images a pair of optical fibers and generates imaging data. The determination unit determines the type of each of the pair of optical fibers by inputting feature amounts obtained from the imaging data provided from the imaging unit to a determination model for determining types of optical fibers to be spliced based on imaging data of the optical fibers to be spliced, the determination model being created through machine learning using sample data indicating a correspondence relationship between feature amounts obtained from imaging data of the optical fibers and types of the optical fibers from which the feature amounts are obtained. The splicing unit fusion splices the pair of optical fibers to each other on splicing conditions corresponding to a combination of the types of the pair of optical fibers based on determination results from the determination unit. The determination model is created by classifying a plurality of fusion splicers into two or more groups each estimated to have similar tendencies in the imaging data and collecting the sample data for each group. The determination unit determines the type of each of the pair of optical fibers using the determination model corresponding to the group to which the fusion splicer belongs.

The model creation device of the present disclosure includes the determination model creation unit. The determination model creation unit creates a determination model for determining types of optical fibers to be spliced based on imaging data of the optical fibers to be spliced by performing machine learning using sample data indicating a correspondence relationship between feature amounts obtained from imaging data of the optical fibers and types of the optical fibers. The determination model creation unit creates the determination model by classifying the plurality of fusion splicers into two or more groups each estimated to have similar tendencies in the imaging data and collecting the sample data for each group. The model creation device provides each of the fusion splicers with the determination model corresponding to the group to which each of the fusion splicers belongs.

The method of fusion splicing the optical fibers of the present disclosure includes creating determination model, generating imaging data, determining, and fusion splicing. In the creating determination model, a determination model for determining types of optical fibers to be spliced based on imaging data of the optical fibers is created by performing machine learning using sample data indicating a correspondence relationship between feature amounts obtained from imaging data of optical fibers and types of the optical fibers. In the generating imaging data, a pair of optical fibers are imaged and imaging data is generated. In the determining, the type of each of the pair of optical fibers is determined by inputting feature amounts obtained from the imaging data generated in the generating imaging data into the determination model. In the fusion splicing, the pair of optical fibers are fusion spliced to each other on splicing conditions corresponding to a combination of the types of the pair of optical fibers based on determination results from the determining. In the creating determination model, the determination model is created for each group by classifying a plurality of fusion splicers performing the generating imaging data, the determining, and the fusion splicing into two or more groups each estimated to have similar tendencies in the imaging data and collecting the sample data from the plurality of the fusion splicers. In the determining, the type of each of the pair of optical fibers is determined using the determination model corresponding to the group to which the fusion splicer performing the determining belongs.

DESCRIPTION OF EMBODIMENTS

Figure 1:
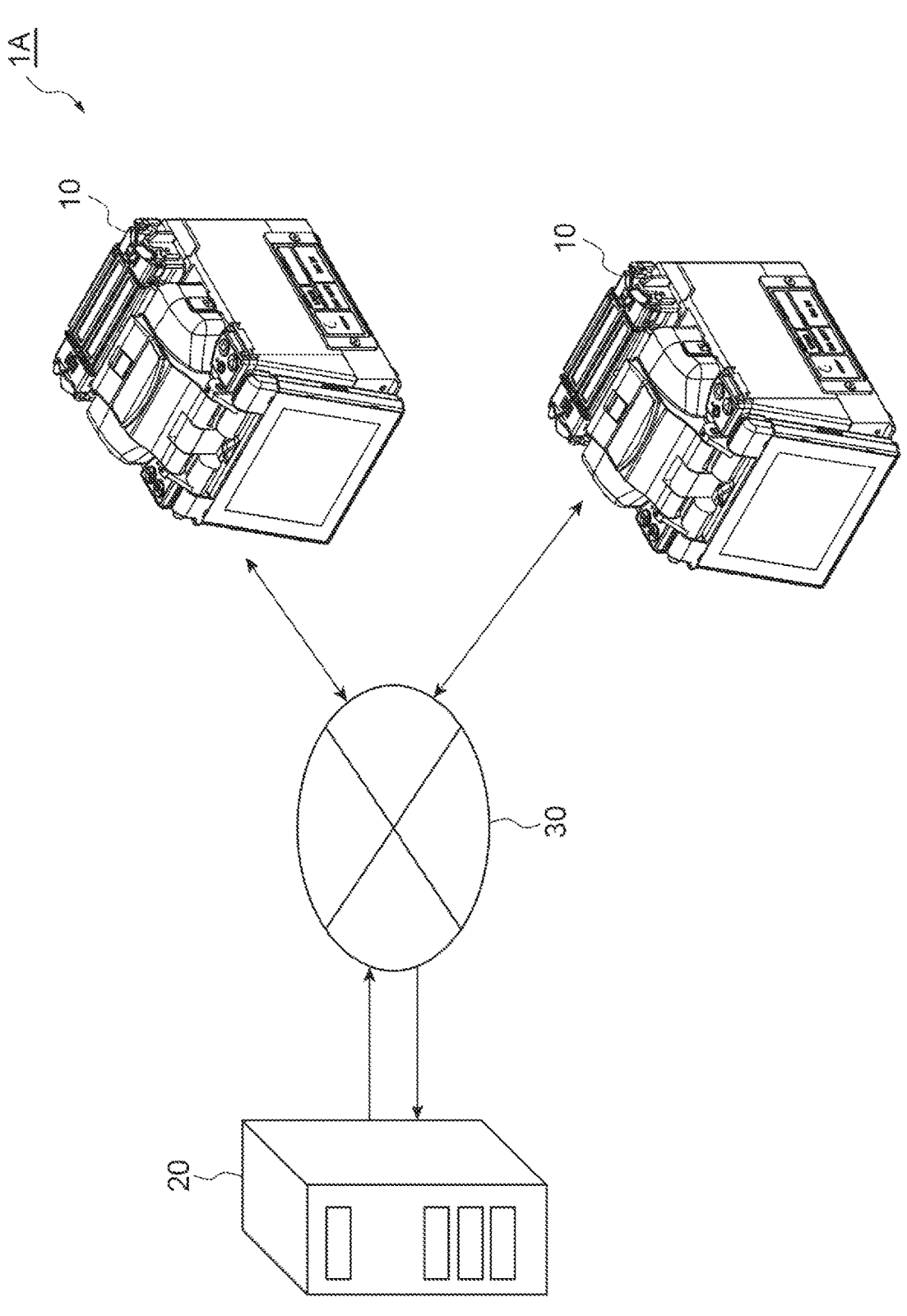
FIG. 1 is a view schematically showing a configuration of an optical fiber fusion splicing system according to an embodiment of the present disclosure.

Problems to be Solved by the Present Disclosure

There are various types of optical fibers. The types of optical fibers are distinguished, for example, by features regarding application and optical properties as well as structural features. Features regarding applications and optical properties include features for a single mode fiber (SMF), a multi mode fiber (MMF), a general-purpose single mode fiber, a dispersion shifted single mode fiber (DSF), and a non-zero dispersion shifted single mode fiber (NZDSF). Structural features include a diameter of the optical fiber, a core diameter, materials of a core and a clad, and a refractive index distribution in a radial direction. The optimum fusion conditions for fusion splicing a pair of optical fibers, for example, the discharge time and the relative position between the optical fibers, vary according to the combination of the types of the pair of optical fibers. However, the types of optical fibers already laid are often unknown. Therefore, it is important for the fusion splicer to accurately determine the combination of the types of the pair of optical fibers to be spliced.

For example, in the system described in Patent Literature 1, a determination model capable of determining the types of optical fibers from the brightness distribution data of the optical fibers in the radial direction is created using machine learning. However, there are mechanical and structural variations in an imaging device included in the fusion splicer. Therefore, even in a case where the same optical fibers are imaged, the obtained imaging data is slightly different for each fusion splicer. Therefore, even if the machine learning is performed based on the imaging data obtained from the plurality of fusion splicers, the accuracy of determining is limited.

Effects of the Present Disclosure

According to the present disclosure, it is possible to provide the fusion splicing system for optical fibers, the fusion splicer, the model creation device, and the method for fusion splicing optical fibers, which can improve the accuracy of determining the types of the optical fibers.

Description of Embodiments of the Present Disclosure

First, embodiments of the present disclosure will be listed and described. This fusion splicing system for optical fibers according to an embodiment includes a model creation device and a plurality of fusion splicers. The model creation device creates a determination model for determining types of optical fibers to be spliced based on imaging data of the optical fibers to be spliced by performing machine learning using sample data indicating a correspondence relationship between feature amounts obtained from imaging data of the optical fibers and types of the optical fibers. Each of the fusion splicers has an imaging unit, a determination unit, and a splicing unit. The imaging unit images a pair of optical fibers and generates imaging data. The determination unit determines the type of each of the pair of optical fibers by inputting the feature amounts obtained from the imaging data provided from the imaging unit into the determination model. The splicing unit fusion splices the pair of optical fibers to each other on splicing conditions corresponding to a combination of the types of the pair of optical fibers based on determination results from the determination unit. The model creation device creates the determination model by classifying the plurality of fusion splicers into two or more groups each estimated to have similar tendencies in the imaging data and collecting the sample data for each group. The determination unit of each of the fusion splicers determines the type of each of the pair of optical fibers using the determination model corresponding to the group to which each of the fusion splicers belongs.

The fusion splicer according to the embodiment has an imaging unit, a determination unit, and a splicing unit. The imaging unit images a pair of optical fibers and generates imaging data. The determination unit determines the type of each of the pair of optical fibers by inputting feature amounts obtained from the imaging data provided from the imaging unit to a determination model for determining types of optical fibers to be spliced based on imaging data of the optical fibers to be spliced, the determination model being created through machine learning using sample data indicating a correspondence relationship between feature amounts obtained from imaging data of the optical fibers and types of the optical fibers having the feature amounts. The splicing unit fusion splices the pair of optical fibers to each other on splicing conditions corresponding to a combination of the types of the pair of optical fibers based on determination results from the determination unit. The determination model is created by classifying a plurality of fusion splicers into two or more groups each estimated to have similar tendencies in the imaging data and collecting the sample data for each group. The determination unit determines the type of each of the pair of optical fibers using the determination model corresponding to the group to which the fusion splicer belongs.

The method of fusion splicing the optical fibers according to the embodiment includes creating determination model, generating imaging data, determining, and fusion splicing. In the creating determination model, a determination model for determining types of optical fibers to be spliced based on imaging data of the optical fibers to be spliced is created by performing machine learning using sample data indicating a correspondence relationship between feature amounts obtained from imaging data of optical fibers and types of the optical fibers. In the generating imaging data, a pair of optical fibers are imaged and imaging data is generated. In the determining, the type of each of the pair of optical fibers is determined by inputting feature amounts obtained from the imaging data generated in the generating imaging data into the determination model. In the fusion splicing, the pair of optical fibers are fusion spliced to each other on splicing conditions corresponding to a combination of the types of the pair of optical fibers based on determination results from the determining. In the creating determination model, the determination model is created for each group by classifying a plurality of fusion splicers performing the generating imaging data, the determining, and the fusion splicing into two or more groups each estimated to have similar tendencies in the imaging data and collecting the sample data from the plurality of the fusion splicers. In the determining, the type of each of the pair of optical fibers is determined using the determination model corresponding to the group to which the fusion splicer performing the determining belongs.

In the fusion splicing system, the fusion splicer, and the method for fusion splicing described above, the types of optical fibers are determined using the determination model obtained by performing machine learning using sample data indicating a correspondence relationship between feature amounts obtained from imaging data of optical fibers and the types of the optical fibers from which the feature amounts are obtained. Therefore, high-accuracy determination based on the machine learning is possible. Further, the determination model is created by classifying the plurality of fusion splicers into two or more groups each estimated to have similar tendencies in the imaging data and collecting the sample data for each group. The type of each of the pair of optical fibers is determined using the determination model corresponding to the group to which the fusion splicer belongs. As a result, the machine learning can be performed only within the group in which the mechanical and structural variations of the imaging unit are small. Therefore, the accuracy of determining the types of the optical fibers based on the machine learning can be further improved.

In the fusion splicing system, the fusion splicer, and the method for fusion splicing described above, the machine learning may be deep learning. In this case, the accuracy of determining the types of the optical fibers can be further improved.

In the fusion splicing system, the fusion splicer, and the method for fusion splicing described above, the two or more groups may be classified based on similarity in either one or both of inspection conditions of each of the fusion splicers and inspection results of each of the fusion splicers. The similarity in the inspection conditions and the inspection results is considered to affect the similarity in the tendencies of the imaging data. Therefore, in this case, the plurality of fusion splicers can be properly classified into two or more groups each estimated to have similar tendencies in the imaging data.

In the fusion splicing system, the fusion splicer, and the method for fusion splicing described above, the two or more groups may be classified based on similarity in the imaging data obtained by imaging a reference optical fiber by the imaging unit during inspection of each of the fusion splicers. The similarity in the imaging data obtained by imaging the reference optical fiber during inspection represents the similarity in the tendencies of the imaging data. Therefore, in this case, the plurality of fusion splicers can be properly classified into two or more groups each estimated to have similar tendencies in the imaging data. In this case, the similarity in the imaging data may include similarity in feature amounts obtained from brightness information of the pair of optical fibers in a radial direction.

In the fusion splicing system, the fusion splicer, and the method for fusion splicing described above, the two or more groups may be classified based on similarity in environmental conditions when the reference optical fiber is imaged by the imaging unit during inspection of each of the fusion splicers. The similarity in the environmental conditions when the reference optical fiber during inspection is imaged is considered to affect the similarity in the tendencies of the imaging data. Therefore, in this case, the plurality of fusion splicers can be properly classified into two or more groups each estimated to have similar tendencies in the imaging data. In this case, the environmental conditions may include at least one selected from temperature, humidity, and atmospheric pressure.

In the fusion splicing system, the fusion splicer, and the method for fusion splicing described above, the two or more groups may be classified based on similarity in either one or both of a manufacturer and a date and time of manufacture of each of the fusion splicers. The similarity in either one or both of the manufacturer and the date and time of manufacture of the fusion splicer is considered to affect the similarity in the tendencies of the imaging data. Therefore, in this case, the plurality of fusion splicers can be properly classified into two or more groups each estimated to have similar tendencies in the imaging data.

In the fusion splicing system, the fusion splicer, and the method for fusion splicing described above, the two or more groups may be classified based on similarity in either one or both of a manufacturer and a date and time of manufacture of the imaging unit of each of the fusion splicers. The similarity in either one or both of the manufacturer and the date and time of manufacture of the imaging unit is considered to affect the similarity in the tendencies of the imaging data. Therefore, in this case, the plurality of fusion splicers can be properly classified into two or more groups each estimated to have similar tendencies in the imaging data.

In the fusion splicing system, the fusion splicer, and the method for fusion splicing described above, the imaging unit may have an observation optical portion (a lens). In this case, the two or more groups may be classified based on similarity in either one or both of a manufacturer and a date and time of manufacture of an observation optical portion of each of the fusion splicers. The similarity in either one or both of the manufacturer and the date and time of manufacture of the observation optical portion is considered to affect the similarity in the tendencies of the imaging data. Therefore, in this case, the plurality of fusion splicers can be properly classified into two or more groups each estimated to have similar tendencies in the imaging data.

In the fusion splicing system, the fusion splicer, and the method for fusion splicing described above, the two or more groups may be classified based on similarity in environmental conditions in a place of use of each of the fusion splicers. The similarity in the environmental conditions in the place of use of each of the fusion splicers is considered to affect the similarity in the tendencies of the imaging data. Therefore, in this case, the plurality of fusion splicers can be properly classified into two or more groups each estimated to have similar tendencies in the imaging data. In this case, the environmental conditions may include at least one selected from temperature, humidity, and atmospheric pressure.

In the fusion splicing system, the fusion splicer, and the method for fusion splicing described above, the two or more groups may be classified based on similarity in a deterioration state of each of the fusion splicers. The similarity in the deterioration state of the fusion splicer is considered to affect the similarity in the tendencies of the imaging data. Therefore, in this case, the plurality of fusion splicers can be properly classified into two or more groups each estimated to have similar tendencies in the imaging data. In this case, the deterioration state may include at least one of the following matters: elapsed time from date of manufacture; usage time; the number of discharges; a splicing frequency; a degree of contamination of a discharge electrode; a dimming state of a light source that illuminates the pair of optical fibers from a position opposite to the imaging unit; a degree of contamination of an observation optical portion of the imaging unit; and device diagnosis results.

In the fusion splicing system, the fusion splicer, and the method for fusion splicing described above, the two or more groups may be classified based on similarity in the types of the optical fibers to be spliced in each of the fusion splicers. The similarity in the types of the optical fibers to be spliced is considered to affect the similarity in the tendencies of the imaging data. Therefore, in this case, the plurality of fusion splicers can be properly classified into two or more groups each estimated to have similar tendencies in the imaging data.

The model creation device according to the embodiment includes a determination model creation unit. The determination model creation unit creates a determination model for determining types of optical fibers to be spliced based on imaging data of the optical fibers to be spliced by performing machine learning using sample data indicating a correspondence relationship between feature amounts obtained from imaging data of the optical fibers and types of the optical fibers. The determination model creation unit creates the determination model by classifying the plurality of fusion splicers into two or more groups each estimated to have similar tendencies in the imaging data and collecting the sample data for each group. The model creation device provides each of the fusion splicers with the determination model corresponding to the group to which each of the fusion splicers belongs.

In the model creation device described above, the determination model is created by classifying the plurality of fusion splicers into two or more groups each estimated to have similar tendencies in the imaging data and collecting the sample data for each group. As a result, the machine learning can be performed only within the group in which the mechanical and structural variations of each of the fusion splicers are small. Therefore, the accuracy of determining the types of the optical fibers based on the machine learning can be further improved.

Details of Embodiments of the Present Disclosure

Specific examples of the fusion splicing system for optical fibers, the fusion splicer, the model creation device, and the method for fusion splicing optical fibers of the present disclosure will be described below with reference to the drawings. The present invention is not limited to these examples, but is defined by the scope of the claims, and is intended to include meanings equivalent to the scope of the claims and all modifications within the scope. In the following description, the same elements will be denoted by the same reference signs in the description of the drawings, without redundant description.

FIG. 1 is a view schematically showing a configuration of a fusion splicing system 1A according to an embodiment of the present disclosure. The fusion splicing system 1A includes a plurality of fusion splicers 10 and a model creation device 20. The fusion splicer 10 is a device that performs fusion splicing of the optical fibers. The model creation device 20 is a device that creates a determination model for determining the types of the optical fibers. The model creation device 20 is a computer capable of communicating with the plurality of fusion splicers 10 via an information communication network 30. The information communication network 30 is, for example, the Internet. The location area of the model creation device 20 is separated from the location area of the fusion splicer 10.

Figure 2:
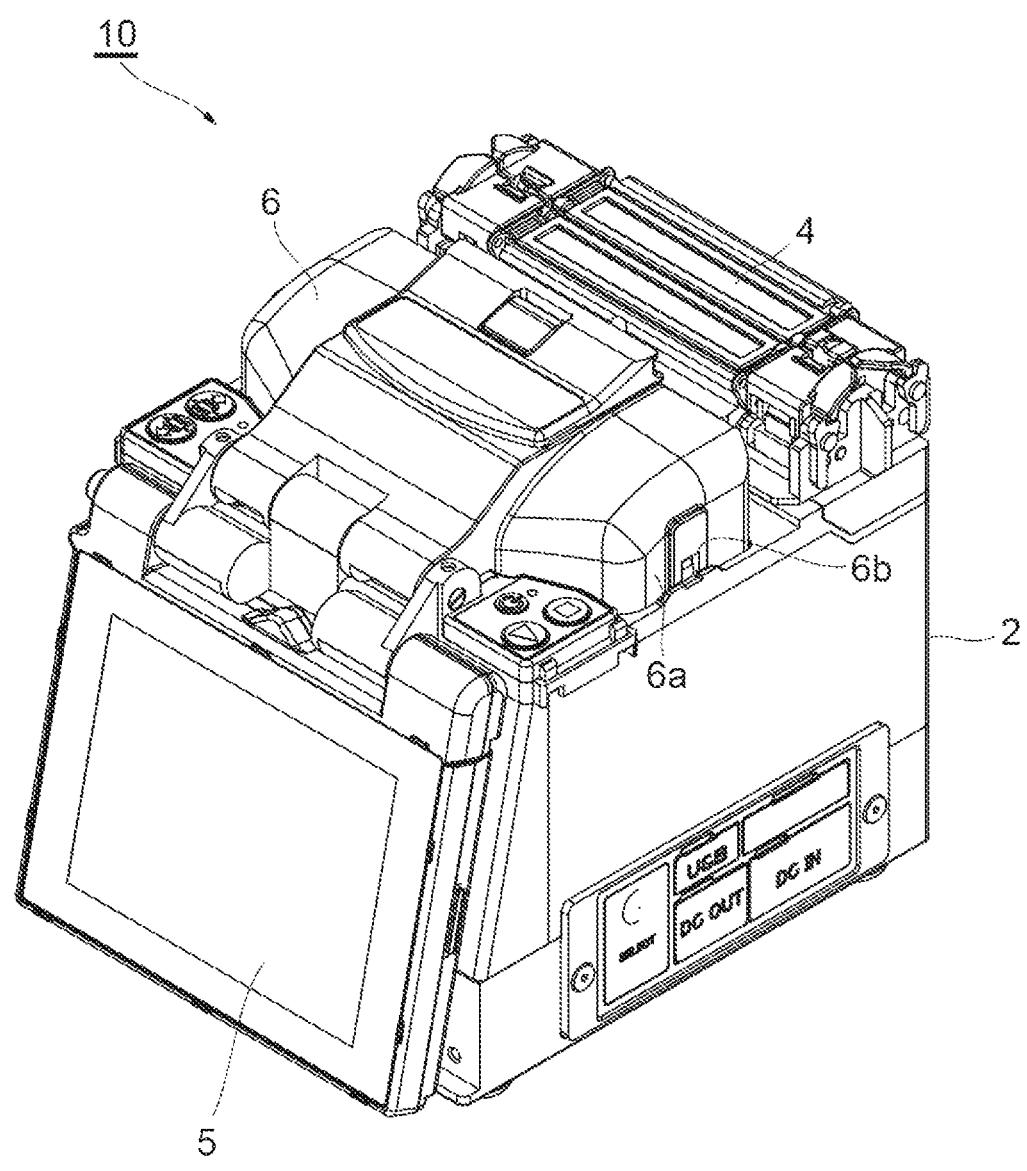
FIG. 2 is a perspective view showing the appearance of a fusion splicer in a state where a windshield cover is closed.
Figure 3:
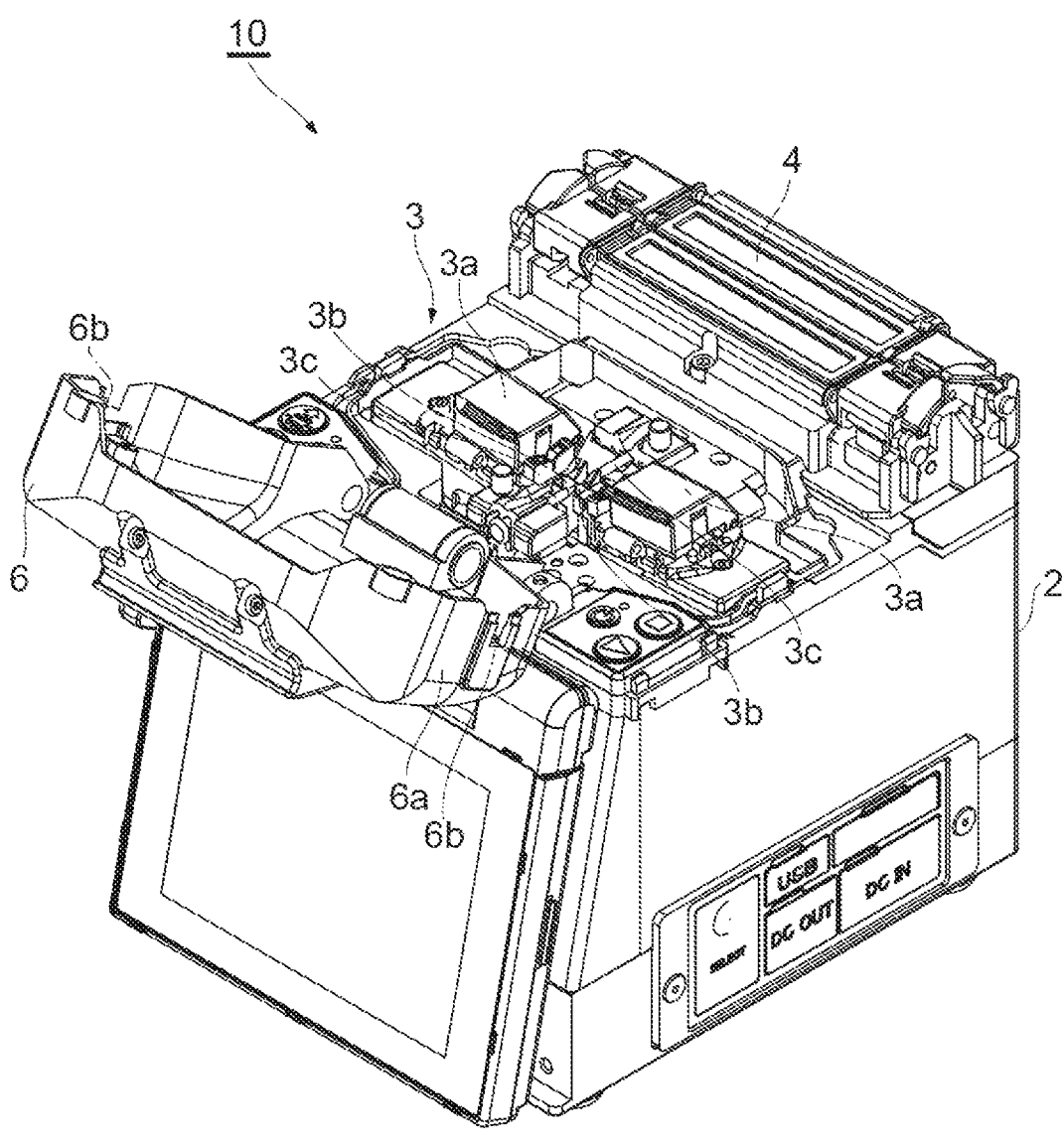
FIG. 3 is a perspective view showing the appearance of the fusion splicer in a state where the windshield cover is opened and the internal structure of the fusion splicer can be seen.

FIGS. 2 and 3 are perspective views showing the appearance of the fusion splicer 10. FIG. 2 shows the appearance in a state where a windshield cover is closed, and FIG. 3 shows the appearance in a state where the windshield cover is opened and the internal structure of the fusion splicer 10 can be seen. As shown in FIGS. 2 and 3, the fusion splicer 10 includes a box-shaped housing 2. An upper portion of the housing 2 is provided with a heater 4 and a splicing unit 3 for fusion splicing the optical fibers. The heater 4 is a portion that heats and shrinks a fiber reinforcing sleeve that is put on a splicing portion between the optical fibers that are fused and spliced in the splicing unit 3. The fusion splicer 10 includes a monitor 5 that displays a fusion splicing status between the optical fibers which are imaged by an imaging unit (which will be described later) disposed inside the housing 2. Further, the fusion splicer 10 includes a windshield cover 6 for preventing wind from entering the splicing unit 3.

The splicing unit 3 has a holder placing portion on which a pair of optical fiber holders 3a can be placed, a pair of fiber positioning portions 3b, and a pair of discharge electrodes 3c. Each of the optical fibers to be fused is held and fixed in one of the optical fiber holders 3a, and the optical fiber holders 3a are each placed and fixed on the holder placing portions. The fiber positioning portions 3b are disposed between the pair of optical fiber holders 3a and position a tip end portion of the optical fiber held in each of the optical fiber holders 3a. The discharge electrodes 3c are electrodes for fusing tip ends of the optical fibers through an arc discharge and are disposed between the pair of fiber positioning portions 3b.

The windshield cover 6 is connected to the housing 2 to cover the splicing unit 3 to be openable and closable. An introduction port 6b for introducing the optical fiber into the splicing unit 3, that is, into each of the optical fiber holders 3a, is formed on each of side surfaces 6a of the windshield cover 6.

Figure 4:
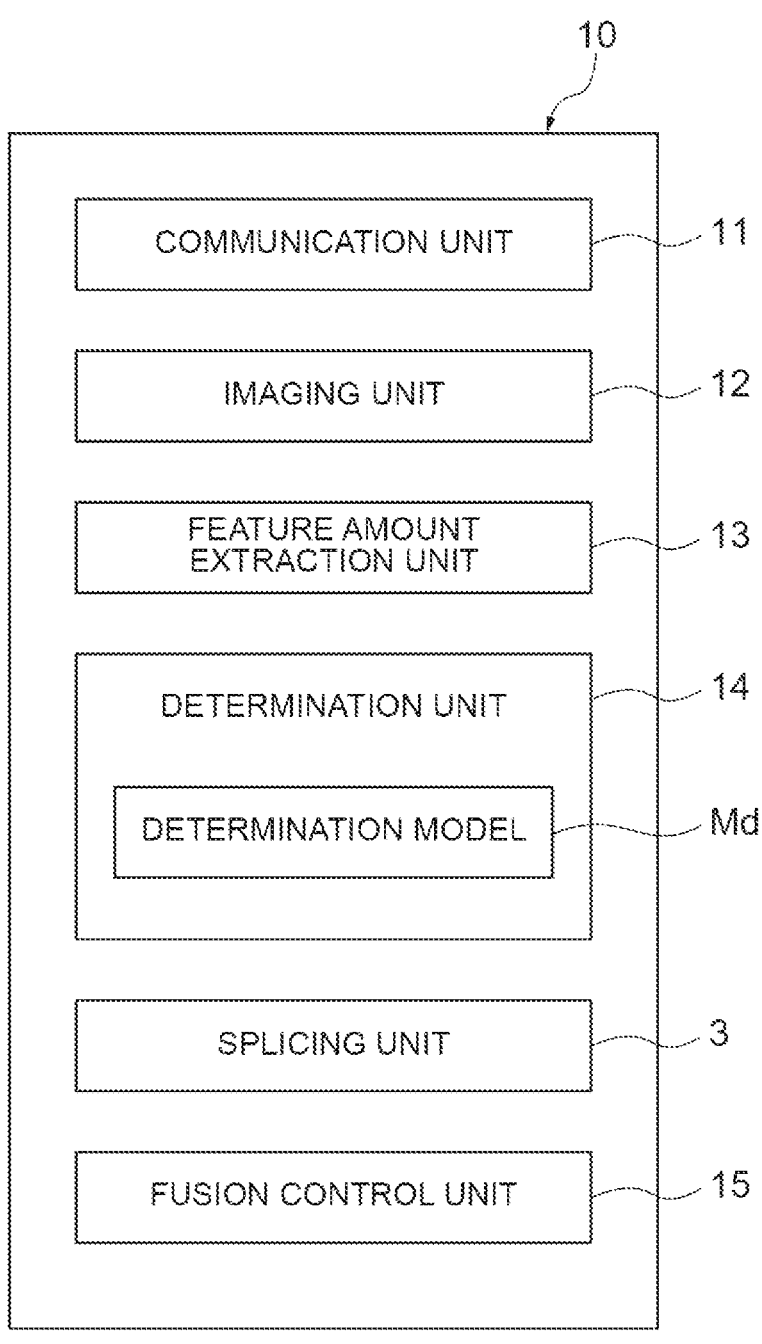
FIG. 4 is a block diagram showing a functional configuration of the fusion splicer.
Figure 5:
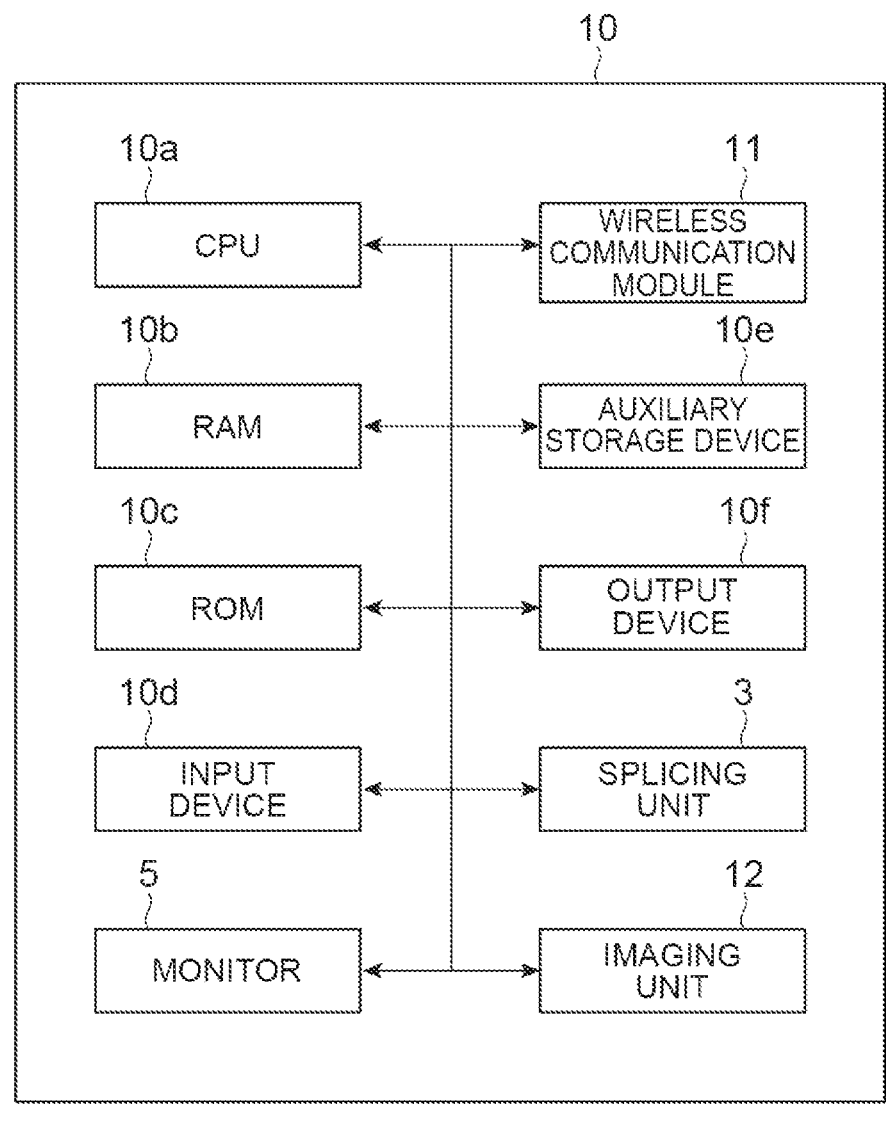
FIG. 5 is a block diagram showing a hardware configuration of the fusion splicer.

FIG. 4 is a block diagram showing a functional configuration of the fusion splicer 10. FIG. 5 is a block diagram showing a hardware configuration of the fusion splicer 10. As shown in FIG. 4, the fusion splicer 10 is functionally provided with the splicing unit 3, a communication unit 11, an imaging unit 12, a feature amount extraction unit 13, a determination unit 14, and a fusion control unit 15. The imaging unit 12 includes an imaging element and an observation optical portion that outputs a magnified image of an object to be imaged to the imaging element. The observation optical portion includes, for example, one or more lenses. As shown in FIG. 5, the fusion splicer 10 includes, as a control unit, a computer provided with hardware such as a CPU 10a, a RAM 10b, a ROM 10c, an input device 10d, an auxiliary storage device 10e, and an output device 10f. By these constituent elements being operated by a program or the like, each function of the fusion splicer 10 is realized. These elements in the control unit are electrically connected to the splicing unit 3, the monitor 5, a wireless communication module as the communication unit 11, and the imaging unit 12 described above. The input device 10*d* may include a touch panel integrally provided with the monitor 5.

The communication unit 11 is constituted by, for example, a wireless LAN module. The communication unit 11 transmits and receives various data to and from the model creation device 20 via the information communication network 30 such as the Internet. The imaging unit 12 images a pair of optical fibers to be spliced in a radial direction of the optical fibers via the observation optical portion (the lens) with the pair of optical fibers facing each other and generates imaging data. The feature amount extraction unit 13 extracts two or more feature amounts for specifying the types of the optical fibers from the imaging data obtained from the imaging unit 12. The feature amounts include brightness information of each optical fiber in the radial direction. The brightness information of the optical fiber in the radial direction includes at least one selected from, for example, brightness distribution of the optical fiber in the radial direction, an outer diameter of the optical fiber, an outer diameter of a core, a ratio of the outer diameter of the core to the outer diameter of the optical fiber, an area proportion of a core to a clad of the optical fiber, total brightness of optical fiber, positions and the number of variation points of brightness distribution in a cross section of the optical fiber, a brightness difference between a core portion and a clad portion of the optical fiber, and a width of the core portion having a specific brightness or more. Further, the imaging data used for extracting the feature amounts may include data acquired while performing the discharge in a state where the pair of optical fibers to be spliced face each other. In this case, the feature amounts include, for example, at least one selected from a light intensity at a specific position and a temporal light intensity variation at the specific position.

The determination unit 14 stores and holds a determination model Md for determining the types of the optical fibers. The determination unit 14 inputs the feature amounts obtained from the feature amount extraction unit 13 into the determination model Md and determines the type of each of the pair of optical fibers. Determination results from the determination unit 14 are displayed on the monitor 5. In a case where the type of each of the pair of optical fibers displayed on the monitor 5 is incorrect, the user inputs the correct type via the input device 10*d* and corrects the determination results. Alternatively, the user may input the type of each of the pair of optical fibers via the input device 10*d* regardless of the determination results from the determination unit 14. In that case, the input by the user is preferentially adopted, and the type of each of the optical fibers is specified. Alternatively, selecting one of manufacturing conditions set in advance for each type of the optical fibers is also possible instead of the input of the type of the corresponding optical fiber itself.

The fusion control unit 15 controls the operation of the splicing unit 3. That is, the fusion control unit 15 receives the operation of a switch by the user and controls a contact operation and an arc discharge between the tip ends of the pair of optical fibers in the splicing unit 3. The contact operation between the tip ends of the pair of optical fibers includes a positioning process of the optical fibers which is performed by the fiber positioning portions 3*b*, that is, the control of a tip end position of each optical fiber. The control of the arc discharge includes the control of discharge power, discharge start timing, and discharge end timing. Various splicing conditions such as the tip end position of the optical fiber and the discharge power are set in advance for each combination of the types of the pair of optical fibers and are stored in, for example, the ROM 10*c*. The fusion control unit 15 selects splicing conditions according to the combination of the types of the pair of optical fibers determined by the determination unit 14 or input by the user. That is, the splicing unit 3 recognizes the combination of the types of the pair of optical fibers based on the determination results from the determination unit 14 or input results from the user and fusion splices the pair of optical fibers to each other under the splicing conditions according to the combination.

Figure 6:
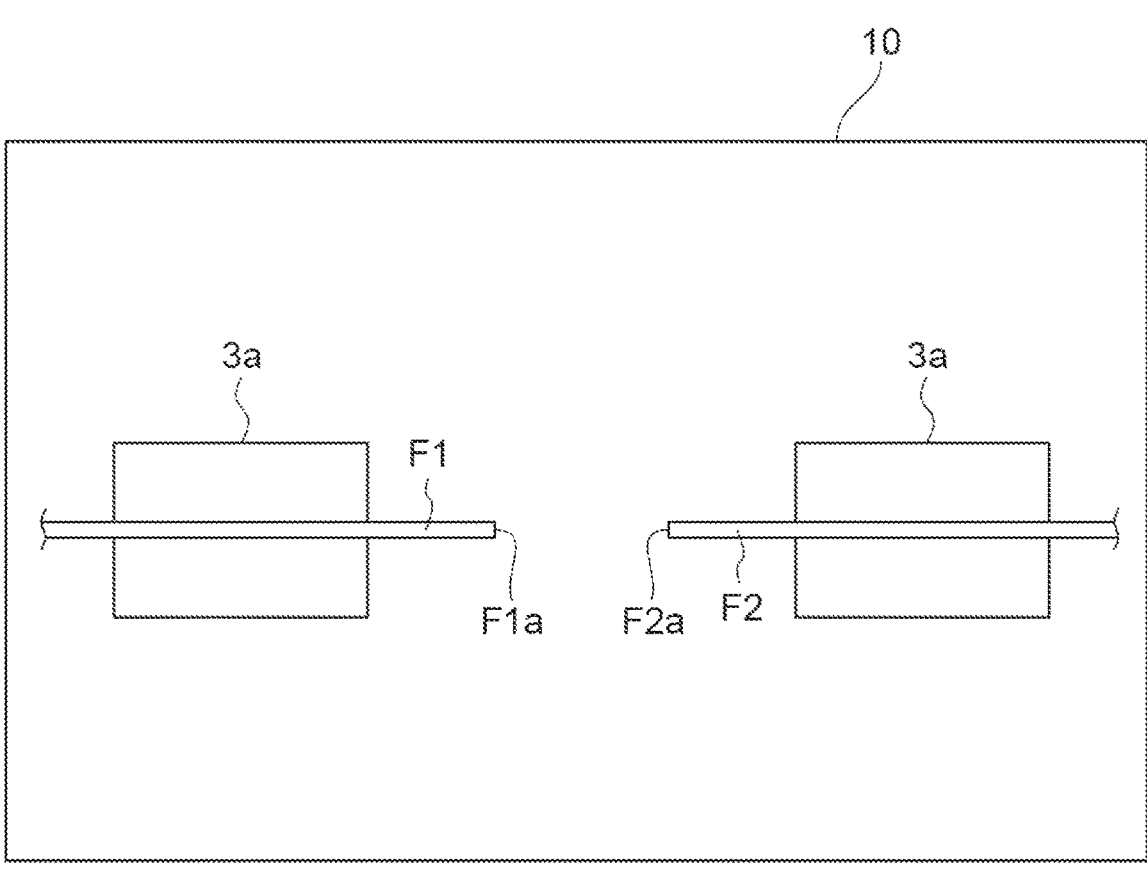
FIG. 6 is a view showing the operation of a splicing unit.
Figure 7:
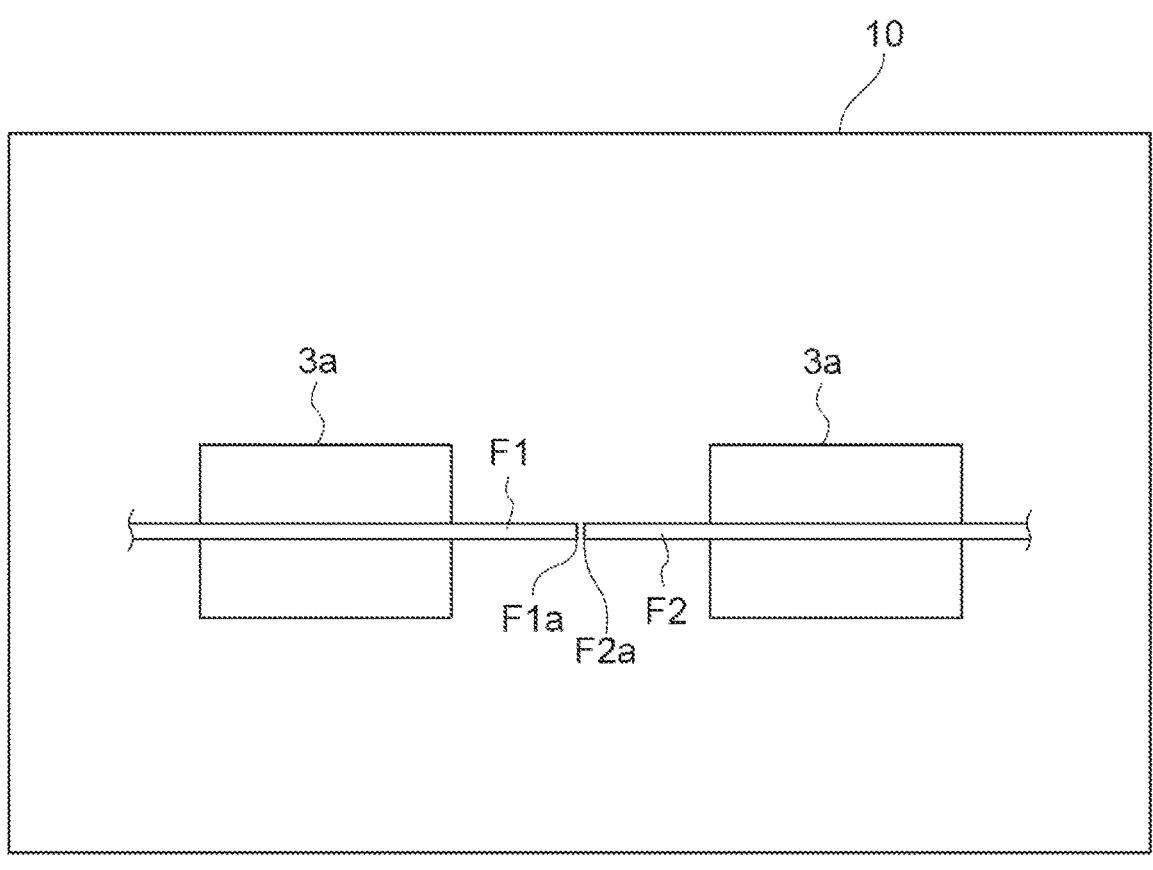
FIG. 7 is a view showing the operation of the splicing unit.
Figure 8:
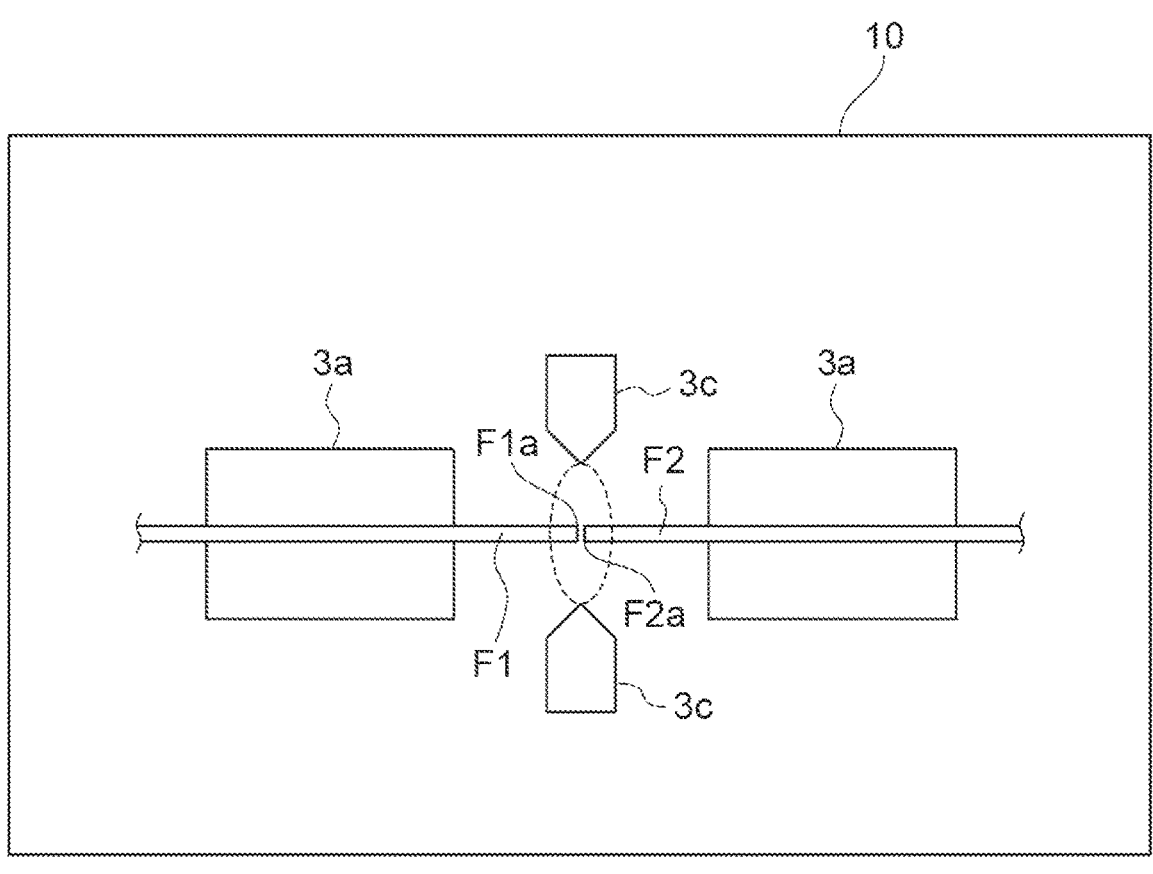
FIG. 8 is a view showing the operation of the splicing unit.

The operation of the splicing unit 3 is as follows. First, as shown in FIG. 6, the user causes the optical fiber holders 3*a* to hold a pair of optical fibers F1 and F2 to be spliced. At this time, the end surface F1*a* of the optical fiber F1 and the end surface F2*a* of the optical fiber F2 are disposed to face each other. Next, the user instructs the fusion splicer 10 to start the fusion splicing. This instruction is given via, for example, a switch input. In response to this instruction, as shown in FIG. 7, the fusion control unit 15 positions the optical fibers F1 and F2 based on positions of the end surfaces F1*a* and F2*a* set as the splicing conditions. After that, as shown in FIG. 8, the fusion control unit 15 starts the arc discharge between the pair of discharge electrodes 3*c*.

Immediately after the start of the arc discharge, the end surfaces F1*a* and F2*a* are separated from each other. The arc discharge corresponds to a preliminary discharge for presoftening the end surfaces F1*a* and F2*a* before fusion. When the arc discharge is started, the fusion control unit 15 controls positions of the fiber positioning portions 3*b* to bring the end surfaces F1*a* and F2*a* closer to each other and bring them into contact with each other. Then, the fusion control unit 15 performs a main discharge by continuing the arc discharge. As a result, the end surfaces F1*a* and F2*a* are further softened and fused to each other.

In the present embodiment, the splicing conditions include at least one of the following items: positions of the end surfaces F1*a* and F2*a* before the start of the discharge; a gap between the end surfaces F1*a* and F2*a* before the start of the discharge; a preliminary discharge time; a main discharge time; a pushing amount after the end surfaces F1*a* and F2*a* are in contact with each other; a pulling back amount after pushing the end surfaces F1*a* and F2*a*; a preliminary discharge power; a main discharge power; and a discharge power at the time of pulling back.

The positions of the end surfaces F1*a* and F2*a* before the start of the discharge refer to positions of the end surfaces F1*a* and F2*a* with a line connecting central axes of the pair of discharge electrodes 3*c*, that is, a discharge central axis in a state shown in FIG. 7, that is, at the time of starting the preliminary discharge as a reference. A distance between the discharge central axis and each of the end surfaces F1*a* and F2*a* changes according to the positions of these end surfaces. This increases or decreases the amount of heating, that is, the amount of melting. In addition, the time required for movement until the end surfaces F1*a* and F2*a* come into contact with each other changes. The gap between the end surfaces F1*a* and F2*a* before the start of the discharge refers to a gap between the end surfaces F1*a* and F2*a* in a state shown in FIG. 7, that is, at the time of starting the preliminary discharge. The time required for movement until the end surfaces F1*a* and F2*a* come into contact with each other changes according to the gap. The pre-discharge time refers to a time from the start of the arc discharge in a state shown in FIG. 7 to the start of relative movement of the optical fibers F1 and F2 in order to bring the end surfaces F1*a* and F2*a* into contact with each other. The main discharge time refers to a time from when the end surfaces F1a and F2a come into contact with each other until the end of the arc discharge, in other words, a time until the application of the voltage to the pair of discharge electrodes 3c is stopped. The preliminary discharge and the main discharge are continuously performed in time. The pushing amount after the end surfaces F1a and F2a are in contact with each other refers to a movement distance of each optical fiber holder 3a when the optical fibers F1 and F2 are further relatively moved in directions in which the end surfaces F1a and F2a are close to each other during discharge after the optical fibers F1 and F2 are relatively moved to bring the end surfaces F1a and F2a into contact with each other. The pulling back amount after pushing the end surfaces F1a and F2a refers to a movement distance of each optical fiber holder 3a when the optical fibers F1 and F2 are relatively moved in opposite directions during discharge, that is, in directions in which the end surfaces F1a and F2a are away from each other, after the end surfaces F1a and F2a are brought into contact with each other and then the end surfaces F1a and F2a are pushed. The preliminary discharge power refers to an arc discharge power in a period from the start of the arc discharge in a state shown in FIG. 7 to the start of relative movement of the optical fibers F1 and F2 in order to bring the end surfaces F1a and F2a into contact with each other.

Figure 9:
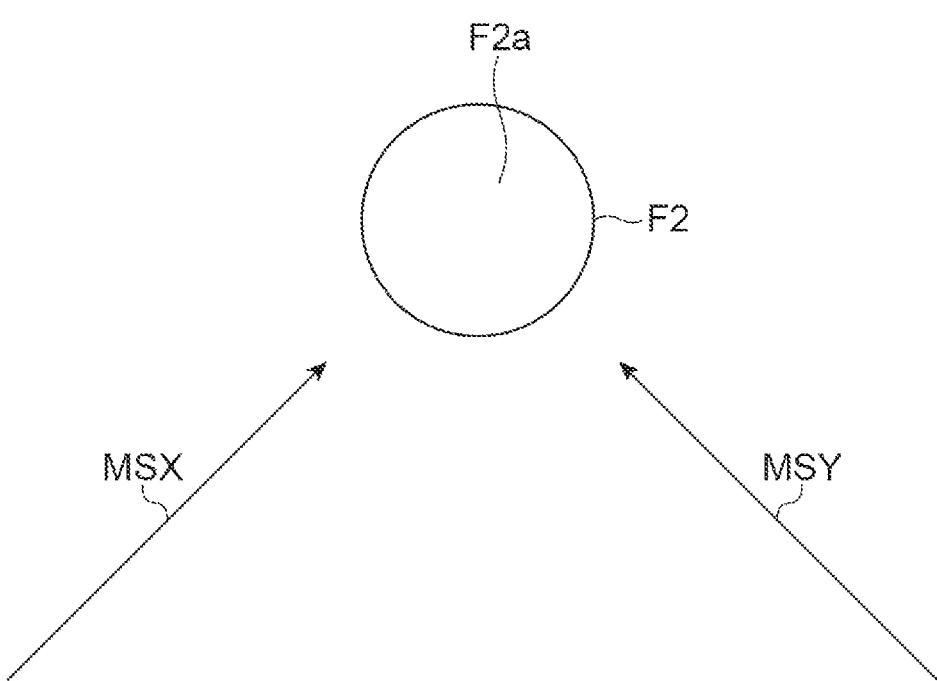
FIG. 9 is a front view of an end surface of one optical fiber.

Here, FIG. 9 is a view of the end surface F2a of one of the optical fibers F2 as viewed from the front, that is, in an optical axis direction. Each of the arrows MSX and MSY in the figure indicates an imaging direction of the imaging unit 12. That is, in this example, at least two imaging units 12 are installed, and the two imaging units 12 image the end surfaces F1a and F2a in directions which are in the radial direction of the optical fibers F1 and F2 and orthogonal to each other. A light source for illuminating the optical fibers F1 and F2 is disposed at a position facing the imaging unit 12 with the optical fibers F1 and F2 interposed therebetween. The light source is, for example, a light emitting diode.

Figure 10:
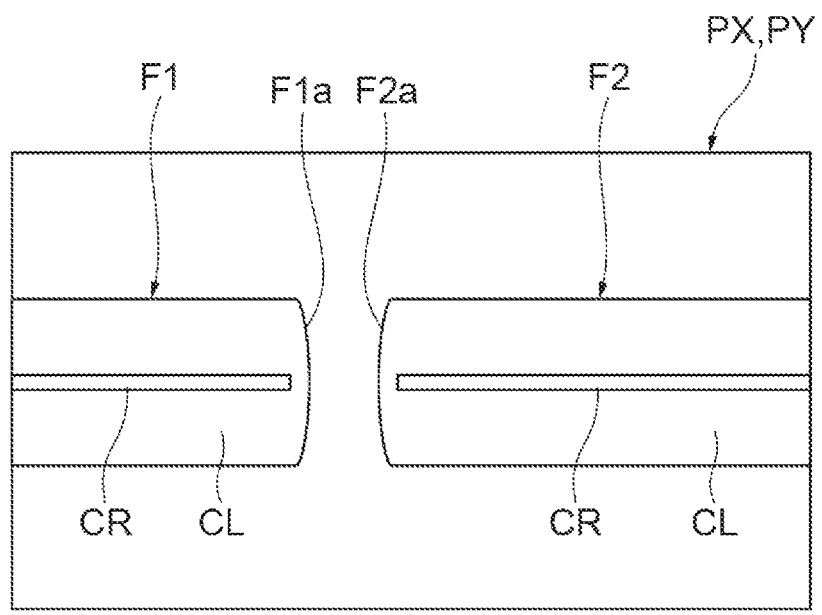
FIG. 10 is a view schematically showing imaging data obtained in an imaging unit.

FIG. 10 is a view schematically showing imaging data PX obtained by the imaging unit 12 imaging in the direction MSX or imaging data PY obtained by the imaging unit 12 imaging in the direction MSY. As shown in FIG. 10, in these imaging data PX and PY, the positions and shapes of the optical fibers F1 and F2 are confirmed by the contours of a core CR and a clad CL. The core CR becomes bright with the illumination light from the light source. The clad CL becomes dark due to the refraction of the illumination light from the light source.

Figure 11:
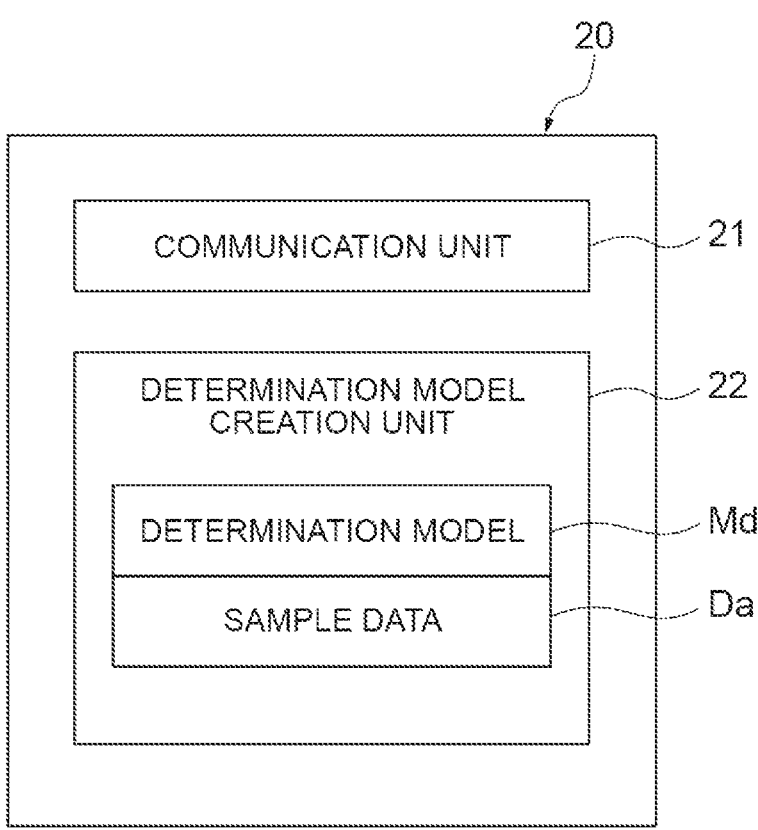
FIG. 11 is a block diagram showing a functional configuration of a model creation device.
Figure 12:
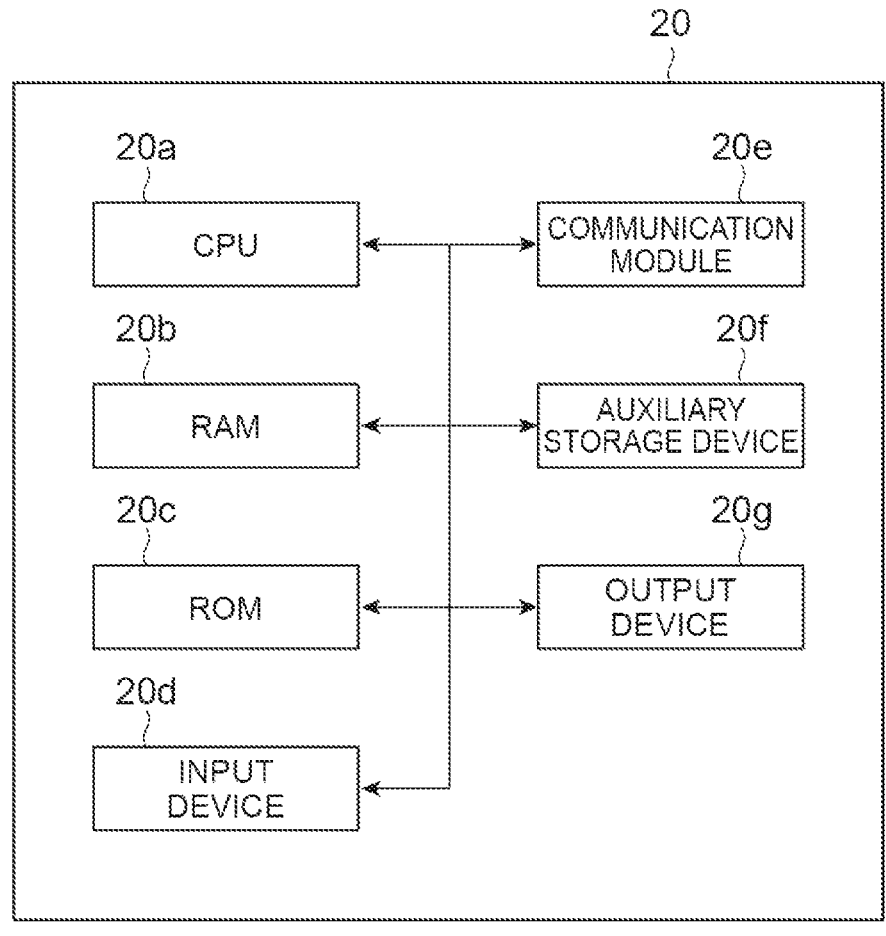
FIG. 12 is a block diagram showing a hardware configuration of the model creation device.

FIG. 11 is a block diagram showing a functional configuration of the model creation device 20. FIG. 12 is a block diagram showing a hardware configuration of the model creation device 20. As shown in FIG. 11, the model creation device 20 functionally includes a communication unit 21 and a determination model creation unit 22. As shown in FIG. 12, the model creation device 20 includes a computer provided with hardware such as a CPU 20a, a RAM 20b, a ROM 20c, an input device 20d, a communication module 20e, an auxiliary storage device 20f, and an output device 20g. By these constituent elements being operated by a program or the like, each function of the model creation device 20 is realized.

The communication unit 21 shown in FIG. 11 communicates with the plurality of fusion splicers 10 via the information communication network 30 (see FIG. 1) such as the Internet. The communication unit 21 receives the feature amounts extracted from the imaging data PX and PY and information regarding the types of the optical fibers F1 and F2 from the plurality of fusion splicers 10 via the information communication network 30. The communication unit 21 may receive the imaging data PX and PY themselves instead of the feature amounts extracted from the imaging data PX and PY. In that case, the model creation device 20 extracts the feature amounts from the imaging data PX and PY. The information regarding the types of the optical fibers F1 and F2 may be only the information input by the user. In other words, the communication unit 21 receives the information regarding the types of the optical fibers F1 and F2 which is input by the user and the feature amounts extracted from the imaging data PX and PY of the optical fibers F1 and F2 or the imaging data themselves from each fusion splicers 10. The information regarding the types of the optical fibers F1 and F2 inputted by the user includes a case where one of the manufacturing conditions preset for each type of the optical fibers F1 and F2 is selected in place of the input of the types themselves of the optical fibers F1 and F2. The communication unit 21 provides the received information to the determination model creation unit 22 as sample data Da showing the correspondence relationship between the feature amounts obtained from the imaging data PX and PY of the optical fibers F1 and F2 and the types of the optical fibers F1 and F2.

The determination model creation unit 22 performs machine learning using the sample data Da provided from the communication unit 21. Then, the determination model creation unit 22 creates the determination model Md for determining the types of the optical fibers F1 and F2 based on the imaging data PX and PY. The machine learning is preferably deep learning. As a technique of the machine learning, various techniques included in so-called supervised learning such as a neural network and a support vector machine can be applied. The determination model creation unit 22 continuously performs the machine learning using a huge amount of the sample data Da obtained from a large number of fusion splicers 10 in operation and enhances the accuracy of the determination model Md. The determination model creation unit 22 of the present embodiment classifies the plurality of fusion splicers 10 into two or more groups each estimated to have similar tendencies in the imaging data PX and PY. Then, the determination model creation unit 22 creates the determination model Md for each group by collecting the sample data Da for each group. Creating the determination model Md for each group means that the determination model Md created by performing the machine learning using only the sample data Da obtained from the plurality of fusion splicers 10 belonging to a certain group is provided only to the fusion splicers 10 belonging to the group.

Two or more groups each estimated to have similar tendencies in the imaging data PX and PY are classified based on, for example, at least one of the following items (1) to (9).

(1) Similarity in Inspection Results of Fusion Splicer 10

In a case where the plurality of fusion splicers 10 have similarity in inspection results of the fusion splicer 10, particularly, inspection results in inspection items regarding the imaging unit 12, the fusion splicers 10 are estimated to have similar tendencies in the imaging data PX and PY. For example, this is the case where a reference optical fiber is imaged by the imaging unit 12 during inspection of each fusion splicer 10, and the brightness information such as the brightness distribution in the obtained imaging data PX, PY is similar to each other in the plurality of fusion splicers 10. Further, for example, in the imaging data PX and PY obtained by imaging the reference optical fiber by the imaging unit 12 during inspection of each fusion splicer 10, this is the case where the plurality of fusion splicers 10 have similarity in at least one selected from: a difference in a degree of softening of the reference optical fiber, that is, a change amount in an end surface position of the reference optical fiber; and a shape of the softened reference optical fiber. Further, for example, this is the case where the plurality of fusion splicers 10 have similarity in the discharge power when the softening degree of the reference optical fiber is set to the same level during inspection of each fusion splicer 10.

(2) Similarity in Inspection Conditions of Fusion Splicer 10

In a case where the plurality of fusion splicers 10 have similarity in inspection conditions of the fusion splicer 10, particularly, inspection conditions in inspection items regarding the imaging unit 12, the fusion splicers 10 are estimated to have similar tendencies in the imaging data PX and PY. For example, this is the case where the plurality of fusion splicers 10 have similarity in the environmental conditions when the reference optical fiber is imaged by the imaging unit 12 during inspection of each fusion splicer 10. The environmental conditions include, for example, at least one selected from temperature (an air temperature), humidity, and atmospheric pressure.

(3) Similarity in a Manufacturer and a Date and Time of Manufacture of Fusion Splicer 10

In a case where the plurality of fusion splicers 10 have similarity in either one or both of a manufacturer and a date and time of manufacture of the fusion splicer 10, the fusion splicers 10 are estimated to have similar tendencies in the imaging data PX and PY. Having similarity in the date and time of manufacture may mean, for example, that the lots are the same. Having similarity in the manufacturer may mean, for example, that they are manufactured in the same manufacturer or in the same factory.

(4) Similarity in a Manufacturer and a Date and Time of Manufacture of Imaging Unit 12

In a case where the plurality of fusion splicers 10 have similarity in either one or both of a manufacturer and a date and time of manufacture of the imaging unit 12, the fusion splicers 10 are estimated to have similar tendencies in the imaging data PX and PY. Having similarity in the date and time of manufacture may mean, for example, that the lots are the same. Further, having similarity in the manufacturer may mean, for example, that they are manufactured in the same manufacturer or in the same factory.

(5) Similarity in a Manufacturer and a Date and Time of Manufacture of Observation Optical Portion (Lens) of Imaging Unit 12

In a case where the plurality of fusion splicers 10 have similarity in either one or both of a manufacturer and a date and time of manufacture of the observation optical portion (the lens) of the imaging unit 12, the fusion splicers 10 are estimated to have similar tendencies in the imaging data PX and PY. Having similarity in the date and time of manufacture may mean, for example, that the production lots are the same. Further, having similarity in the manufacturer may mean, for example, that they are manufactured in the same manufacturer or in the same factory.

(6) Similarity in Environmental Conditions in Place of Use of Fusion Splicer 10

In a case where the plurality of fusion splicers 10 have similarity in the environmental conditions in a place of use of the fusion splicer 10, the fusion splicers 10 are estimated to have similar tendencies in the imaging data PX and PY. The environmental conditions include, for example, at least one selected from temperature (an air temperature), humidity, and atmospheric pressure. For example, it is conceivable to perform classification in which a plurality of fusion splicers 10 used in a hot and humid region are grouped together into one group, a plurality of fusion splicers 10 used in a cold region are grouped together into another group, and a plurality of fusion splicers 10 used in highlands are grouped together into still another group.

(7) Similarity in Deterioration State of Fusion Splicer 10

In a case where the plurality of fusion splicers 10 have similarity in a deterioration state of the fusion splicer 10, the fusion splicers 10 are estimated to have similar tendencies in the imaging data PX and PY. The deterioration state of the fusion splicer 10 includes, for example, at least one of following matters: elapsed time from date of manufacture; usage time; the number of discharges; a splicing frequency; a degree of contamination of the discharge electrode 3c; a dimming state of a light source that illuminates the optical fibers from a side opposite to the imaging unit 12; a degree of contamination of the observation optical portion of the imaging unit 12; and device diagnosis results.

(8) Similarity in Types of Optical Fibers to be Spliced

In a case where the plurality of fusion splicers 10 have similarity in the types of the optical fibers F1 and F2 mainly to be spliced in a field where the fusion splicer 10 is used, the fusion splicers 10 are estimated to have similar tendencies in the imaging data PX and PY. Here, the types of optical fibers F1 and F2 refer to rough types of optical fibers such as a single mode fiber, a multimode fiber, a general-purpose fiber, and a distributed shift fiber, and the like.

(9) Similarity in Discharge State of Fusion Splicer 10

When the imaging data PX and PY in a discharge state are used, in a case where the plurality of fusion splicers 10 have similarity in a discharge state of the fusion splicer 10, the fusion splicers 10 are estimated to have similar tendencies in the imaging data PX and PY. Here, the discharge state can be represented by feature amounts of the brightness information obtained from the imaging data acquired while the discharge is performed in a state where the pair of optical fibers are not installed. Grouping is performed according to similarity in the feature amounts. In this case, the feature amounts include, for example, at least one of the following matters: the light intensity at a specific point determined with reference to the central axis direction of the discharge electrode 3c; and the light intensity distribution shape of the imaging data in a specific direction. The specific direction is, for example, a direction orthogonal to a discharge direction or a direction parallel to the discharge direction.

In this way, the determination model Md created by collecting the sample data Da for each group is transmitted to the fusion splicer 10 belonging to the corresponding group via the communication unit 21. The determination unit 14 of each fusion splicer 10 determines the type of each of the pair of optical fibers F1 and F2 using the determination model Md corresponding to the group to which the fusion splicer 10 belongs.

Figure 13:
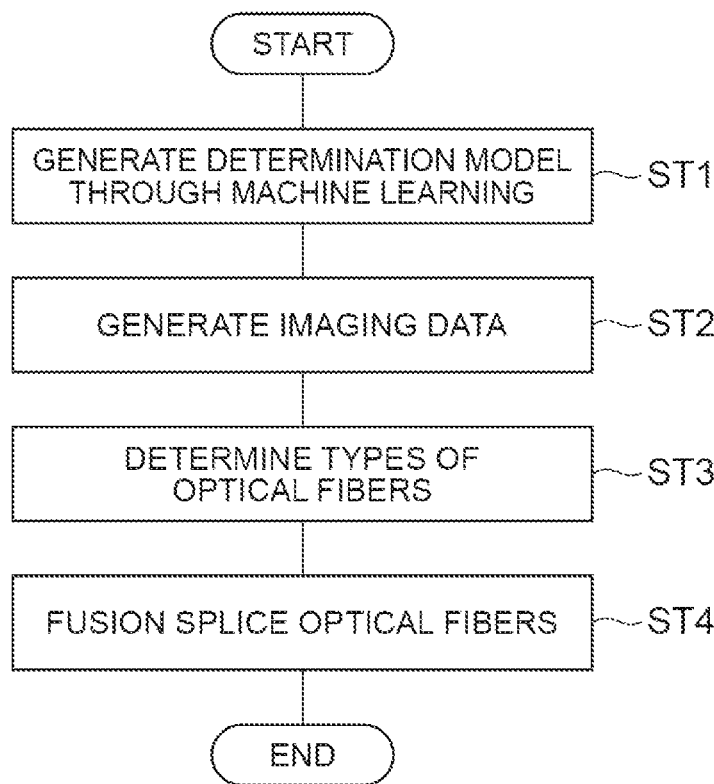
FIG. 13 is a flowchart showing a method according to the embodiment.

FIG. 13 is a flowchart showing a method for fusion splicing the optical fibers according to the present embodiment. This method can be suitably realized using the fusion splicing system 1A described above. First, as a model creation step ST1, the machine learning is performed using the sample data Da indicating a correspondence relationship between the feature amounts obtained from the imaging data of the optical fibers and the types of the optical fibers. Then, the determination model Md for determining the types of the optical fibers F1 and F2 to be spliced based on the imaging data PX and PY of the optical fibers F1 and F2 is created. In this model creation step ST1, the plurality of fusion splicers 10 are classified into two or more groups each estimated to have similar tendencies in the imaging data PX and PY. Then, the determination model Md is created by collecting the sample data Da for each group. Next, as an imaging step ST2, the pair of optical fibers F1 and F2 are imaged, and the imaging data PX and PY are generated. Subsequently, as a determination step ST3, the type of each of the pair of optical fibers F1 and F2 is determined by inputting the feature amounts obtained from the imaging data PX and PY generated in the imaging step ST2 into the determination model Md. In the determination step ST3, the type of each of the pair of optical fibers F1 and F2 is determined using the determination model Md corresponding to the group to which the fusion splicer 10 performing the determination step ST3 belongs. Subsequently, as a splicing step ST4, the pair of optical fibers F1 and F2 are fusion spliced to each other on splicing conditions corresponding to a combination of the types of the pair of optical fibers F1 and F2 based on determination results from the determination step ST3.

The effects obtained by the fusion splicing system 1A, the fusion splicer 10, and the method for fusion splicing of the present embodiment described above will be described. In the present embodiment, the machine learning is performed using the sample data Da indicating a correspondence relationship between the feature amounts obtained from the imaging data PX and PY of the optical fibers F1 and F2 and the types of the optical fibers F1 and F2. Then, the types of the optical fibers F1 and F2 are determined using the obtained determination model Md. Therefore, high-accuracy determination based on the machine learning is possible. Further, the determination model Md is created by classifying the plurality of fusion splicers 10 into two or more groups each estimated to have similar tendencies in the imaging data PX and PY and collecting the sample data Da for each group. The type of each of the pair of optical fibers F1 and F2 is determined using the determination model Md corresponding to the group to which the fusion splicer 10 belongs. As a result, the machine learning can be performed only within the group in which the mechanical and structural variations of the imaging unit 12 are small, and thus the accuracy of determining the types of the optical fibers based on the machine learning can be further improved.

As mentioned above, the machine learning may be the deep learning. In this case, the accuracy of determining the types of the optical fibers can be further improved.

As described above, the two or more groups may be classified based on similarity in either one or both of the inspection conditions and results of each fusion splicer 10. The similarity in the inspection conditions and results is considered to affect the similarity in the tendencies of the imaging data PX and PY. Therefore, in this case, the plurality of fusion splicers 10 can be properly classified into two or more groups each estimated to have similar tendencies in the imaging data PX and PY.

As described above, the two or more groups may be classified based on similarity in the imaging data PX and PY obtained by imaging the reference optical fiber by the imaging unit 12 during inspection of each fusion splicer 10. The similarity in the imaging data PX and PY obtained by imaging the reference optical fiber during inspection represents the similarity in the tendencies of the imaging data PX and PY. Therefore, in this case, the plurality of fusion splicers 10 can be properly classified into two or more groups each estimated to have similar tendencies in the imaging data PX and PY.

As described above, the two or more groups may be classified based on similarity in the environmental conditions, for example, the temperature, the humidity, and the atmospheric pressure when the reference optical fiber is imaged by the imaging unit 12 during inspection of each fusion splicer 10. The similarity in the environmental conditions when the reference optical fiber is imaged during inspection is considered to affect the similarity in the tendencies of the imaging data PX and PY. Therefore, in this case, the plurality of fusion splicers 10 can be properly classified into two or more groups each estimated to have similar tendencies in the imaging data PX and PY.

As described above, the two or more groups may be classified based on similarity in either one or both of the manufacturer and the date and time of manufacture of each fusion splicer 10. The similarity in either one or both of the manufacturer and the date and time of manufacture of the fusion splicer 10 is considered to affect the similarity in the tendencies of the imaging data PX and PY. Therefore, in this case, the plurality of fusion splicers 10 can be properly classified into two or more groups each estimated to have similar tendencies in the imaging data PX and PY.

As described above, the two or more groups may be classified based on similarity in either one or both of the manufacturer and the date and time of manufacture of the imaging unit 12. The similarity in either one or both of the manufacturer and the date and time of manufacture of the imaging unit 12 is considered to affect the similarity in the tendencies of the imaging data PX and PY. Therefore, in this case, the plurality of fusion splicers 10 can be properly classified into two or more groups each estimated to have similar tendencies in the imaging data PX and PY.

As described above, the two or more groups may be classified based on similarity in either one or both of the manufacturer and the date and time of manufacture of the observation optical portion of the imaging unit 12. The similarity in either one or both of the manufacturer and the date and time of manufacture of the observation optical portion of the imaging unit 12 is considered to affect the similarity in the tendencies of the imaging data PX and PY. Therefore, in this case, the plurality of fusion splicers 10 can be properly classified into two or more groups each estimated to have similar tendencies in the imaging data PX and PY.

As described above, the two or more groups may be classified based on similarity in the environmental conditions, for example, the temperature, the humidity, and the atmospheric pressure in the place of use of each fusion splicer 10. The similarity in the environmental conditions in the place of use of each fusion splicer 10 is considered to affect the similarity in the tendencies of the imaging data PX and PY. Therefore, in this case, the plurality of fusion splicers 10 can be properly classified into two or more groups each estimated to have similar tendencies in the imaging data PX and PY.

As described above, the two or more groups may be classified based on similarity in the deterioration state of each fusion splicer 10. The similarity in the deterioration state of the fusion splicer 10 is considered to affect the similarity in the tendencies of the imaging data PX and PY. Therefore, in this case, the plurality of fusion splicers 10 can be properly classified into two or more groups each estimated to have similar tendencies in the imaging data PX and PY.

As described above, the two or more groups may be classified based on similarity in the types of the optical fibers to be spliced in each fusion splicer 10. The similarity in the types of the optical fibers to be spliced is considered to affect the similarity in the tendencies of the imaging data PX and

17

PY. Therefore, in this case, the plurality of fusion splicers 10 can be properly classified into two or more groups each estimated to have similar tendencies in the imaging data PX and PY.

As described above, the two or more groups may be classified based on similarity in the discharge state of each fusion splicer 10. The similarity in the discharge state of each fusion splicer 10 is considered to affect the similarity in the tendencies of the imaging data PX and PY. Therefore, in this case, the plurality of fusion splicers 10 can be properly classified into two or more groups each estimated to have similar tendencies in the imaging data PX and PY.

The model creation device 20 of the present embodiment includes the determination model creation unit 22. The determination model creation unit 22 performs the machine learning using the sample data Da indicating a correspondence relationship between the feature amounts obtained from the imaging data PX and PY of the optical fibers F1 and F2 and the types of the optical fibers F1 and F2. Then, the determination model Md for determining the types of the optical fibers F1 and F2 to be spliced based on the imaging data PX and PY of the optical fibers F1 and F2 to be spliced is created. The determination model creation unit 22 creates the determination model Md by classifying the plurality of fusion splicers 10 into two or more groups each estimated to have similar tendencies in the imaging data PX and PY and collecting the sample data Da for each group. The model creation device 20 provides the determination model Md corresponding to the group to which each fusion splicer 10 belongs to each fusion splicer 10. As a result, the machine learning can be performed only within the group in which the mechanical and structural variations of each fusion splicer 10 are small. Therefore, the accuracy of determining the types of the optical fibers F1 and F2 based on the machine learning can be further improved.

The fusion splicing system for optical fibers, the fusion splicer, the model creation device, and the method for fusion splicing optical fibers according to the present disclosure are not limited to the above-described embodiment, and various modifications can be made. For example, the method for classifying two or more groups each estimated to have similar tendencies in the imaging data is not limited to that exemplified in the above embodiment.

REFERENCE SIGNS LIST

1A Fusion splicing system
2 Housing
3 Splicing unit
3a Optical fiber holder
3b Fiber positioning portion
3c Discharge electrode
4 Heater
5 Monitor
6 Windshield cover
6a Side surface
6b Introduction port
10 Fusion splicer
10a CPU
10b RAM
10c ROM
10d Input device
10e Auxiliary storage device
10f Output device
11 Communication unit
12 Imaging unit
13 Feature amount extraction unit

18

14 Determination unit
15 Fusion control unit
20 Model creation device
20a CPU
20b RAM
20c ROM
20d Input device
20e Communication module
20f Auxiliary storage device
20g Output device
21 Communication unit
22 Determination model creation unit
30 Information communication network
CL Clad
CR Core
Da Sample data
F1, F2 Optical fiber
F1a, F2a End surface
Md Determination model
MSX, MSY Direction
PX, PY Imaging data
ST1 Model creation step
ST2 Imaging step
ST3 Determination step
ST4 Splicing step

What is claimed is:

1. A fusion splicing system for optical fibers comprising:
a model creation device configured to create a determination model for determining types of optical fibers to be spliced based on imaging data of the optical fibers to be spliced by performing machine learning using sample data indicating a correspondence relationship between feature amounts obtained from imaging data of the optical fibers and types of the optical fibers; and
a plurality of fusion splicers each having an imaging unit configured to image a pair of optical fibers and to generate imaging data, a determination unit configured to determine a type of each of the pair of optical fibers by inputting feature amounts obtained from the imaging data provided from the imaging unit to the determination model, and a splicing unit configured to fusion splice the pair of optical fibers to each other on splicing conditions corresponding to a combination of the types of the pair of optical fibers based on determination results from the determination unit,
wherein the model creation device creates the determination model by classifying the plurality of fusion splicers into two or more groups each estimated to have similar tendencies in the imaging data and collecting the sample data for each group, and
wherein the determination unit of each of the fusion splicers determines the type of each of the pair of optical fibers using the determination model corresponding to the group to which each of the fusion splicers belongs.

2. The fusion splicing system according to claim 1, wherein the machine learning is deep learning.

3. The fusion splicing system according to claim 1, wherein the two or more groups are classified based on similarity in either one or both of inspection conditions of each of the fusion splicers and inspection results of each of the fusion splicers.

4. The fusion splicing system according to claim 3, wherein the two or more groups are classified based on similarity in the imaging data obtained by imaging a reference optical fiber by the imaging unit during inspection of each of the fusion splicers.

5. The fusion splicing system according to claim 4, wherein the similarity in the imaging data includes similarity in feature amounts obtained from brightness information of the pair of optical fibers in a radial direction.

6. The fusion splicing system according to claim 3, wherein the two or more groups are classified based on similarity in environmental conditions when a reference optical fiber is imaged by the imaging unit during inspection of each of the fusion splicers.

7. The fusion splicing system according to claim 6, wherein the environmental conditions include at least one selected from temperature, humidity, and atmospheric pressure.

8. The fusion splicing system according to claim 1, wherein the two or more groups are classified based on similarity in either one or both of a manufacturer and a date and time of manufacture of each of the fusion splicers.

9. The fusion splicing system according to claim 1, wherein the two or more groups are classified based on similarity in either one or both of a manufacturer and a date and time of manufacture of the imaging unit of each of the fusion splicers.

10. The fusion splicing system according to claim 1, wherein the two or more groups are classified based on similarity in either one or both of a manufacturer and a date and time of manufacture of an observation optical portion of each of the fusion splicers.

11. The fusion splicing system according to claim 1, wherein the two or more groups are classified based on similarity in environmental conditions in a place of use of each of the fusion splicers.

12. The fusion splicing system according to claim 11, wherein the environmental conditions include at least one selected from temperature, humidity, and atmospheric pressure.

13. The fusion splicing system according to claim 1, wherein the two or more groups are classified based on similarity in a deterioration state of each of the fusion splicers.

14. The fusion splicing system according to claim 13, wherein the deterioration state includes at least one of following matters: elapsed time from date of manufacture; usage time; a number of discharges; a splicing frequency; a degree of contamination of a discharge electrode; a dimming state of a light source that illuminates the pair of optical fibers from a position opposite to the imaging unit; a degree of contamination of an observation optical portion of the imaging unit; and device diagnosis results.

15. The fusion splicing system according to claim 1, wherein the two or more groups are classified based on similarity in the types of the optical fibers to be spliced in each of the fusion splicers.

16. A fusion splicer comprising:

an imaging unit configured to image a pair of optical fibers and to generate imaging data;

a determination unit configured to determine a type of each of the pair of optical fibers by inputting feature amounts obtained from the imaging data provided from the imaging unit to a determination model for determining types of optical fibers to be spliced based on imaging data of the optical fibers to be spliced, the determination model being created through machine learning using sample data indicating a correspondence relationship between feature amounts obtained from imaging data of the optical fibers and types of the optical fibers from which the feature amounts are obtained; and a splicing unit configured to fusion splice the pair of optical fibers to each other on splicing conditions corresponding to a combination of the types of the pair of optical fibers based on determination results from the determination unit, wherein the determination model is created by classifying a plurality of fusion splicers into two or more groups each estimated to have similar tendencies in the imaging data and collecting the sample data for each group, and wherein the determination unit determines the type of each of the pair of optical fibers using the determination model corresponding to the group to which the fusion splicer belongs.

17. A model creation device comprising:

a determination model creation unit configured to create a determination model for determining types of optical fibers to be spliced based on imaging data of the optical fibers to be spliced by performing machine learning using sample data indicating a correspondence relationship between feature amounts obtained from imaging data of optical fibers and types of the optical fibers, wherein the determination model creation unit creates the determination model by classifying a plurality of fusion splicers into two or more groups each estimated to have similar tendencies in the imaging data and collecting the sample data for each group, and wherein the model creation device provides each of the fusion splicers with the determination model corresponding to the group to which each of the fusion splicers belongs.

18. A method for fusion splicing optical fibers comprising:

creating a determination model for determining types of optical fibers to be spliced based on imaging data of the optical fibers to be spliced by performing machine learning using sample data indicating a correspondence relationship between feature amounts obtained from imaging data of optical fibers and types of the optical fibers;

generating imaging data by imaging a pair of optical fibers;

determining a type of each of the pair of optical fibers by inputting feature amounts obtained from the imaging data generated in the generating imaging data into the determination model; and fusion splicing the pair of optical fibers to each other on splicing conditions corresponding to a combination of the types of the pair of optical fibers based on determination results from the determining, wherein, in the creating the determination model, the determination model is created for each group by classifying a plurality of fusion splicers performing the generating imaging data, the determining, and the fusion splicing into two or more groups each estimated to have similar tendencies in the imaging data and collecting the sample data from the plurality of the fusion splicers, and wherein, in the determining, the type of each of the pair of optical fibers is determined using the determination model corresponding to the group to which a fusion splicer performing the determining belongs.

* * * * *